United States Patent [19]
Cashmore

[11] Patent Number: 5,358,177
[45] Date of Patent: Oct. 25, 1994

[54] FLUID FLOW AND TEMPERATURE CONTROL APPARATUS

[75] Inventor: Peter R. Cashmore, Lingfield, England

[73] Assignee: The Computer Shower Company Limited, Sidcup, England

[21] Appl. No.: 104,409

[22] Filed: Aug. 10, 1993

Related U.S. Application Data

[63] Continuation of Ser. No. 695,330, May 3, 1991, abandoned.

[30] Foreign Application Priority Data

May 15, 1990 [GB] United Kingdom .............. 9010842

[51] Int. Cl.⁵ .............................................. B05D 23/13
[52] U.S. Cl. .................................. 236/12.12; 137/606;
137/486; 137/332; 236/93 R
[58] Field of Search .............. 236/12.12, 93 R;
137/606, 486, 561 R, 332; 364/510

[56] References Cited

U.S. PATENT DOCUMENTS

| | | | |
|---|---|---|---|
| 3,079,950 | 3/1963 | Rimsha | 137/606 |
| 4,711,392 | 12/1987 | Kidouchi et al. | 236/12.12 |
| 4,909,435 | 3/1990 | Kidouchi et al. | 236/12.12 |
| 4,969,598 | 11/1990 | Garris | 236/12.12 |

FOREIGN PATENT DOCUMENTS 2082350  3/1982  United Kingdom .

*Primary Examiner*—John M. Sollecito
*Attorney, Agent, or Firm*—Watson, Cole, Grindle & Watson

[57] ABSTRACT

Apparatus is provided to supply a liquid, for example water, at a constant temperature, for example to a shower by mixing two supplies of the liquid, one hot and the other cold. Control of the output temperature is effected by measuring and controlling the flow rate in one or both of the supplies by way of flow meters having a rapid response time and motor driven valves.

In the case where the flow rates in both supplies are measured and controlled it is possible further to control the output flow rate in addition to and independently from the output temperature, also by controlling the flow rates in the supplies.

Further accuracy may be achieved by sensing the input supply temperatures in addition to the flow rates.

15 Claims, 3 Drawing Sheets

FLUID FLOW AND TEMPERATURE CONTROL APPARATUS

CROSS-REFERENCE TO RELATED APPLICATION

This is a continuation of application Ser. No. 695,330, filed May 3, 1991, now abandoned.

BACKGROUND OF THE INVENTION

The present invention relates to fluid flow and temperature control apparatus. In particular it is concerned with apparatus for providing liquid, typically water, to a user at a required temperature and/or flow rate where this is achieved by mixing in varying proportions two supplies of the liquid at different temperatures, designated "cold" and "hot" respectively.

The apparatus is of general application but is best explained in relation to the control of a domestic shower which is supplied with both hot and cold water. A prime requirement of such a system is that the output be kept at a required constant temperature regardless of input conditions. A number of arrangements have already been proposed to effect such control which utilize a motorized mixing valve under the control of a microprocessor. In most cases the input parameter for the control system is the temperature of the water output and the control system acts to keep this constant by adjusting the mixing valve to allow, for example, more hot water into the outlet in the case that the outlet temperature falls. The overall flow rate in such a system is typically determined empirically by the user.

In some arrangements, there is provided means for storing preferred flow and temperature settings for future use. This is the case in U.S. Pat, No. 4682728 which monitors the angular position of the valve settings and in U.S. Pat. No. 4696428 which uses inter alia a flow meter in the output from the mixing valve. Both of these prior art systems monitor the temperature of the mixed outlet water.

Problems are caused in this type of system when the input conditions change. For instance, if the pressure in one of the water supplies to a shower were to fall suddenly, then the proportion of water from the other supply in the outlet would increase and the outlet temperature would change. Control systems are designed to account for such variations and to ensure that the outlet temperature remains constant. However, it will be appreciated that the speed of response of the control system, and hence the length of time for which the outlet is not at its required temperature, is dependant on the speed of response of the sensors used to provide data to the control system.

It is conventional for temperature sensors to be the prime means of controlling a shower and that is the case in the above identified U.S. patent disclosures. However, temperature sensors are typically slow to react to rapid temperature changes, and thus systems utilizing such sensors are prone to supplying water which is not at the required temperature for comparatively long periods of time while re-adjustment is made.

There is thus still a need for apparatus for the supply of liquid at constant temperature which will react quickly to changes in the input conditions in order to maintain the required output temperature and/or flow rate.

SUMMARY OF THE INVENTION

According to the present invention this is achieved by the use of a flow meter in one or both of the supplies to sense the flow rate and to supply this data as the input parameter to the control system. The advantage of this is that flow meters react to changes in condition faster than temperature sensors and this enables the control system of the present invention to react to changes in conditions faster than known systems.

The operation of the present invention is based on the following equation, which is essentially an energy continuity equation for the mixer valve:

$$M_c S T_c + M_h S T_h = M_o S T_o \quad (1)$$

where $M_c$, $M_h$, $M_o$ designate the mass flow rates in the cold supply, hot supply and outlet respectively, S designates the specific heat capacity of the liquid being supplied, and $T_c$, $T_h$, $T_o$ designate the temperatures of the cold supply, hot supply and outlet respectively.

Given that $M_o = M_c + M_h$, it will be appreciated that equation (1) can be re-arranged to give:

$$T_o = \frac{M_c T_c + M_h T_h}{M_c + M_h} \quad (2)$$

Thus, it can be seen that outlet temperature, $T_o$, can be controlled by sensing and controlling only input parameters. Of the input parameters, the mass flow rates, $M_c$ and $M_h$, are the most likely to be subject to rapid change, and these parameters can be sensed by the flow meters which have a fast response time. The input temperatures typically vary quite slowly and only a small amount, and thus this variation may be sensed accurately using conventional temperature sensors, in spite of their relatively slow response.

Alternatively, in some cases it is reasonable to assume that the supply temperatures remain constant, in which case it is necessary only to sense the flow rates in order to maintain a constant output temperature.

Further, it may be the case that one supply has a guaranteed flow rate, in which case this parameter need not be sensed.

Flow meters typically measure volume flow rate, which is related to mass flow rate by the equation $m = \rho v$, where $\rho$ designates density and V designates volume flow rate. This may substituted in equation (2) to give:

$$T_o = \frac{\rho_c V_c T_c + \rho_h V_h T_h}{\rho_c V_c + \rho_h V_h} \quad (3)$$

In many situations to which this invention is applicable, $\rho_c \simeq \rho_h$ due to the small change in liquid density over the temperature range concerned and thus equation (3) reduces to:

$$T_o = \frac{V_c T_c + V_h T_h}{V_c + V_h} \quad (4)$$

Alternatively the control system may be adapted to take account of the different densities in the hot and cold supplies.

BRIEF DESCRIPTION OF THE DRAWINGS

In order that the present invention be better understood, embodiments thereof will now be described by way of example with reference to the accompanying drawings, in which.

DETAILED DESCRIPTION OF THE PREFERRED EMBODIMENTS

All of the embodiments described are described in relation specifically to domestic showers, but as mentioned above, this invention is equally applicable to any situation in which it is required to supply liquid at a given temperature by mixing hot and cold supplies in varying proportions.

All of the described embodiments use volume flow meters and it is assumed that $\rho_c = \rho_h$ in these applications. Therefore equation (4) above is used as the basis for discussion of these embodiments.

Before describing the apparatus in detail, it is considered helpful to explain the background of the problems which are encountered with showers. The typical problem which a user faces when showering is that for example, if someone else turns on a hot water tap in the house, then the person showering finds that his shower will go cold due to the reduction in pressure in the hot supply to the shower. Thermostatic mixer showers are made to overcome this problem, but virtually all of these suffer from the slow speed of response of temperature sensors discussed above and from insufficient range of adjustment. It can take more than fifteen seconds to bring the water back to something approaching the original temperature and considerably longer actually to recover the original setting. It will be appreciated that, if the hot water tap were switched off rather than switched on, a conventional thermostatic shower should deliver uncomfortably hot water for at least fifteen seconds. This effect is due to the fact that the temperature sensing divices are not sufficiently responsive to enable rapid accurate temperature control on the basis of temperature sensors in the output alone. In fact, most temperature variations which are desired to be removed are a result of variations in flow rate in the supplies which result in variations in output temperature and flow. The present invention is therefore designed to maintain temperature by monitoring and adjusting where necessary input flows in accurate manner.

Figure 1:
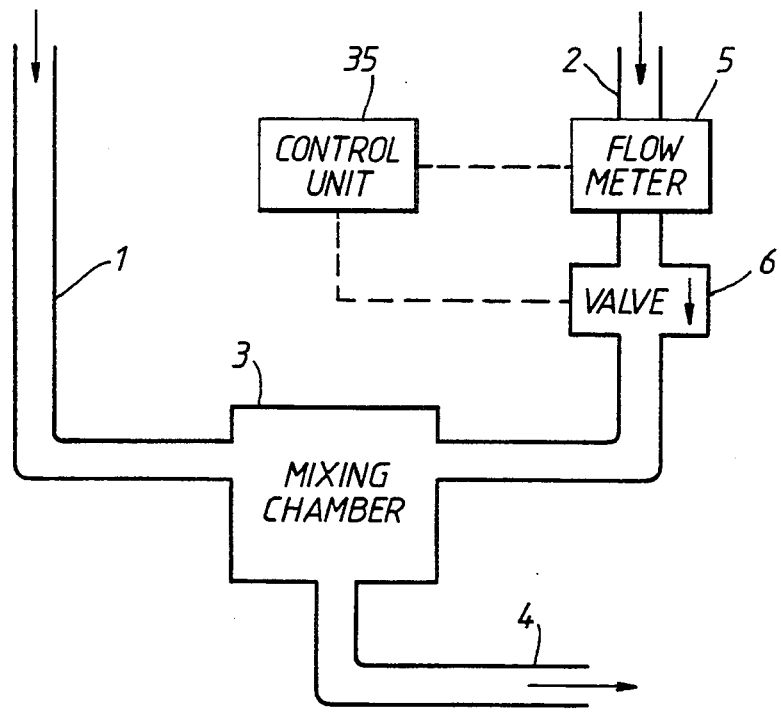
FIG. 1 is a schematic diagram of a first embodiment of the invention.

FIG. 1 is a schematic diagram of a first embodiment of this invention. This embodiment is a very simple example of the invention and is useful for understanding the principle of the invention.

FIG. 1 shows a cold water supply 1 and a hot water supply 2 which are mixed in mixing chamber 3, an outlet 4 from which supplies a shower head, not shown. In this arrangement it is assumed that the temperatures of the hot and cold water are constant and that the flow rate in the cold water supply 1 is constant. This would be the case when, for instance, the cold water is supplied directly from the domestic mains supply.

The flow rate in hot water supply 2 is measured by a flow meter 5 and may be controlled by valve 6. An electrical output from flow meter 5 indicative of the flow rate is connected to a microprocessor control unit 35, which also controls the opening and closing of valve 6.

At the start of use, the output temperature is set by a user by adjusting the flow rate of the hot water supply 2. This may be done either by direct action on valve 6 or via the control of the microprocessor. Once the temperature has been set, the microprocessor takes over complete control in order to maintain a constant outlet temperature.

As stated above, equation (4) gives $$T_o = \frac{V_c T_c + V_h T_h}{V_c + V_h}$$

In this case $V_c$, $T_c$ and $T_h$ are all assumed to be constant. Therefore:

$$T_o = \frac{K_1 + K_2 V_h}{K_3 + V_h} \quad (5)$$

where $K_1$, $K_2$ and $K_3$ are constants.

It will be appreciated from equation (5) that in order for $T_o$ to be held constant it is necessary for $V_h$ to be held constant. This is achieved by the microprocessor controlled valve. The microprocessor records the value of $V_h$ at the initial setting of the required temperature and is operative to maintain $V_h$ at this value. If $V_h$ falls below this value, for instance caused by a drop in the hot water supply pressure, the microprocessor opens valve 6 to allow $V_h$ to rise again to the required value. Due to the sensitivity and rapid response time of flow meter 5, this correction is effected very rapidly, such that the change in input condition has virtually no effect on the user.

It is to be noted that the microprocessor need have no record of the actual value of the output temperature, $T_o$. It is only necessary that the microprocessor keep a record of the required value of $V_h$.

The system may be arranged to memorize the required value of $V_h$ even when not in use in order that the required outlet temperature may be re-established at a later time without the necessity for setting up the system again.

It may be the case in the system of FIG. 1 that the pressure and hence the flow rate in cold water supply 1 is so high that even with valve 6 fully open the output temperature is not as high as required. In such a situation a restrictor may be introduced in cold water supply 1 so that the flow rate, $V_c$, is lower, but is still constant. This would enable the fully required range of output temperatures to be achieved with the control as described above.

FIG. 1 has been described with the control in the hot water supply 2. This is for reasons of safety in domestic shower arrangements and the system is adapted such that in the case of failure, valve 6 shuts fully so that no hot water is supplied. However the invention extends to an arrangement in which the hot water is supplied at a constant flow rate and control of output temperature is effected by a valve in the cold water supply.

Figure 2:
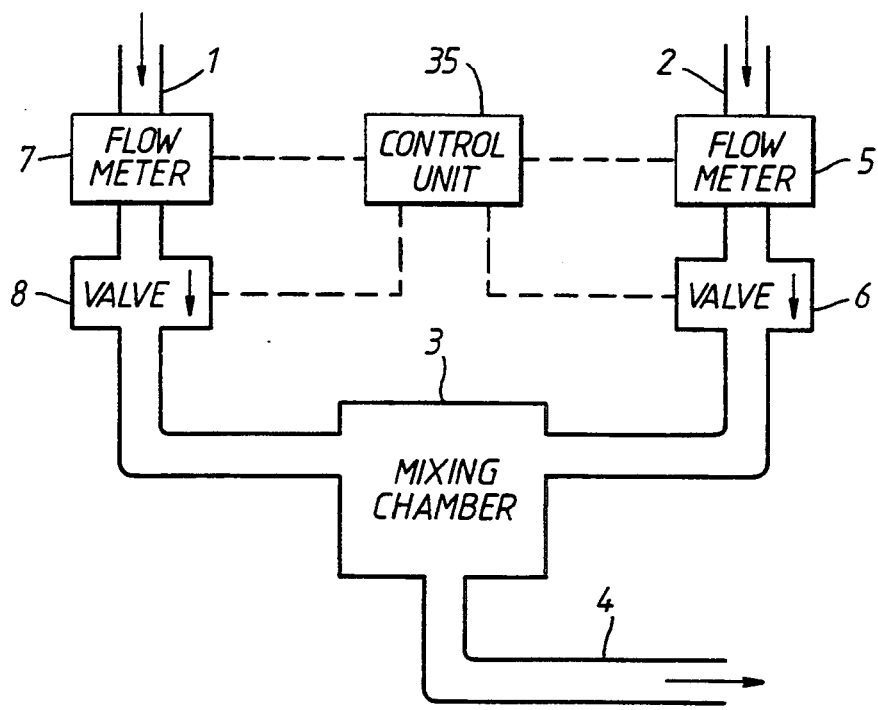
FIG. 2 is a schematic diagram of a second embodiment of the invention.

FIG. 2 shows a schematic diagram of a second embodiment of the invention. In this Figure the same numerals designate similar parts to those in FIG. 1. FIG. 2 shows a cold water supply 1 and a hot water supply 2 which are mixed in mixing chamber 3 and outlet 4 from which supplies a shower, not shown.

The flow rate in hot water supply 2 is measured by first flow meter 5 and may be controlled by first valve 6. The flow rate in cold water supply 3 is measured by second flow meter 7 and may be controlled by second valve 8. Electrical outputs from first and second flow meters 5, 7 indicative of the hot and cold flow rates respectively are connected to a microprocessor control unit 35, which also controls the opening and closing of first and second valves 6, 8. The microprocessor also has an input allowing a user to adjust the required output temperature $T_o$.

This system may be operated as follows. Initially valves 6,8 are both opened to allow 60% of maximum flow rate in each of cold water supply 1 and hot water supply 2. Second valve 8 is held in this position while the user indicates to the microprocessor whether the output temperature should be increased or decreased. This is adjusted by way of first valve 6 in a similar manner to that described above in relation to FIG. 1. Once the required output temperature is reached, the values of $V_c$ and $V_h$ are stored by the microprocessor. In this system $T_c$ and $T_h$ are assumed to be constant and thus output temperature $T_o$ may be maintained constant by controlling valves 6, 8 in order to keep $V_c$ and $V_h$ constant.

It will be understood that the above reference to 60% flow rates is a purely exemplary figure and any suitable values may be chosen for the initial flow rates before the temperature adjustment is made. Also it may be that valve 6 is held fixed and valve 8 is used to adjust the initial output temperature $T_o$, or that both valves 6, 8 are used in the setting of the required output temperature.

Essentially the hot and cold flow rates are adjusted until the required temperature $T_o$ is achieved, and this may then be maintained by controlling first and second valves 6, 8 to ensure that the values of $V_c$ and $V_h$ remain constant However, it will be understood from the following that it is not necessary to maintain the absolute values of $V_c$ and $V_h$ in order to maintain the value of $T_o$.

Equation (4) may be re-arranged to give:

$$T_o = \frac{RT_c + T_h}{R + 1} \qquad (6)$$

where $R = V_c/V_h$

Thus, given that $T_c$ and $T_h$ are constant, $T_o$ will remain constant if the ratio R between the two input flow rates is held constant. For example, if the pressure in the hot supply were to fall suddenly this whould have the effect of (i) causing $V_h$ to fall, (ii) causing the value of $T_o$ to fall and (iii) causing the value of R to rise. In order to restore $T_o$ to its required value, R must be restored to its original value. This may be achieved either by raising $V_h$, reducing $V_c$, or a combination of increasing $V_h$ and reducing $V_c$. Thus the temperature $T_o$ may be restored either by opening first valve 6, partially closing second valve 8, or a combination of these.

The sensitivity and rapid response times of flow meters 5, 7 ensure that correction for changes in input conditions is effected very rapidly. It is to be noted that the microprocessor need have no record of the actual value of the output temperature. For the purpose of temperature control it is necessary only to have a record of the necessary value of ratio R.

The embodiment of FIG. 2 may further be operated such that the output flow rate $V_o$ may be maintained at a required value. The flow continuity equation for mixing chamber 3 gives:

$$V_o = V_c + V_h \qquad (7)$$

It will be understood from equation (7) that once the required output temperature $T_o$ is achieved, a required output flow rate $V_o$ may be established by increasing or decreasing the valves of $V_c$ and $V_h$ while ensuring that the ratio R remains constant.

Thus total control of the output conditions may be effected in the embodiment of FIG. 2 by maintaining $V_c$ and $V_h$ and the values necessary to give the correct ratio for the required value of $T_o$ and to give the correct sum for the required value of $V_o$.

The apparatus shown in FIG. 2 may also be operated such that the required flow rate $V_o$ is established first and then the required temperature $T_o$ is established by adjusting $V_c$ and $V_h$ such that their ratio changes but their sum remains constant.

Further the apparatus of FIG. 2 may be arranged such that adjustment of the required flow rate or temperature may be while the shower is in use.

The system of FIG. 2 may be also arranged to memorize the required values of, say, R and $V_o$, or $V_c$ and $V_h$, in order that the required setting may easily be re-established at a later time.

Figure 3:
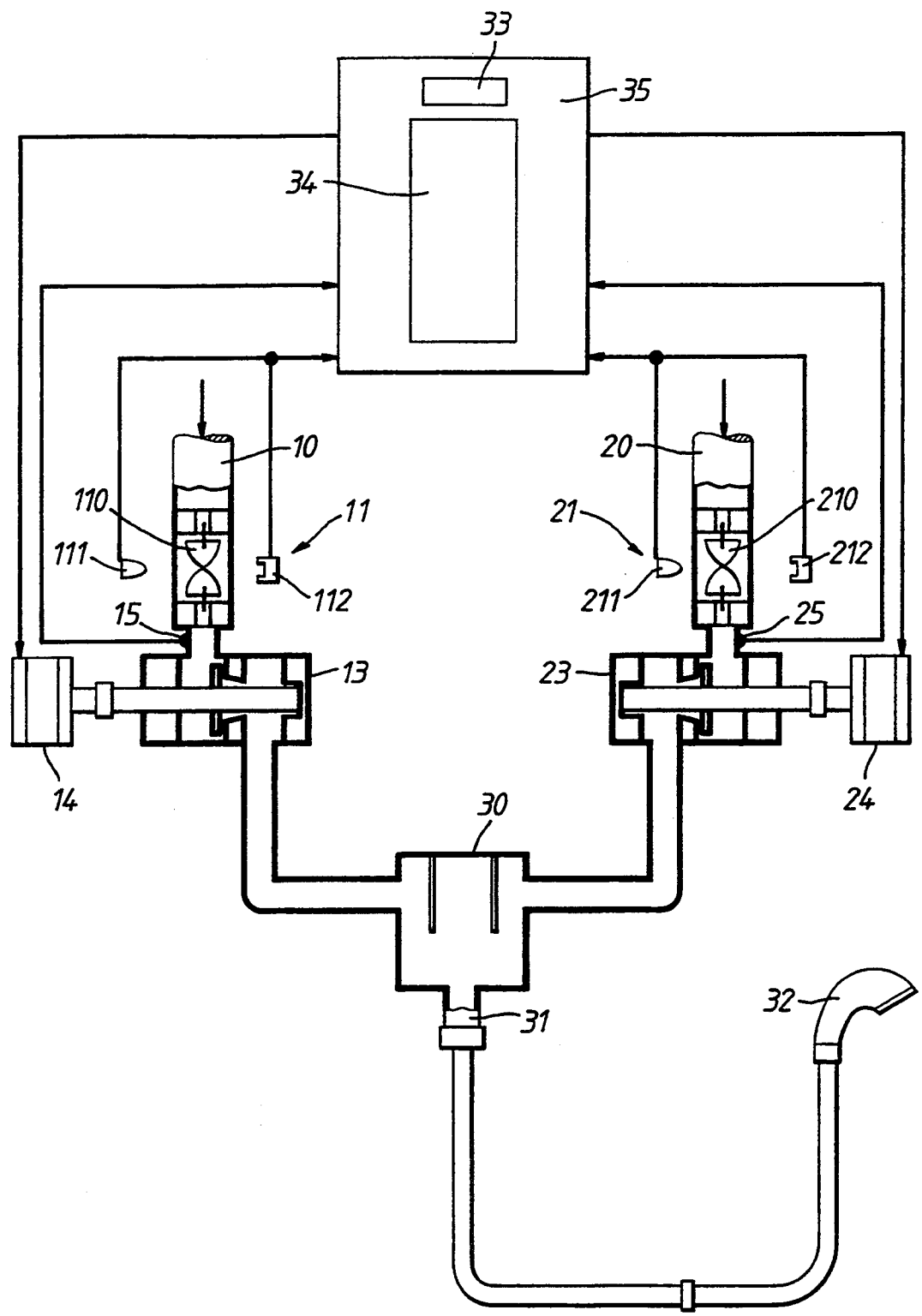
FIG. 3 is a schematic diagram of a third preferred embodiment of the invention.

FIG. 3 shows a third preferred embodiment of the present invention which is a control system for supplying water at a user specified temperature and/or flow rate. The system of FIG. 3 monitors both input flow rates via separate flow meters as well as the temperatures of the hot and cold input water.

In essence the system of FIG. 3 is largely similar to that of FIG. 2 and comprises a cold water supply 10 which feeds mixing chamber 30 via flow meter 11 and needle valve 13, and a hot water supply 20 which feeds mixing chamber 30 via flow meter 21 and needle valve 23. An outlet 31 from mixing chamber 30 feeds shower head 32. Needle valve 13 is operated by stepper motor 14 and needle valve 23 is operated by stepper motor 24.

The system is under the control of control unit 35 which comprises microprocessor 33 and control panel 34. Control unit 35 controls the operation of stepper motors 14, 24 and thereby the valves 13, 23.

Flow meters 11, 21 provide electrical signals to control unit 35 indicative of the instantaneous flow rates of the cold and hot water respectively. The flow meters 11, 12 are preferably of the type comprising a turbine 110, 210, a light source (typically an LED) 111, 211 and a photo-sensitive cell 112, 212. These are arranged such that a light beam from the light source 111, 211 shines across the bore of the flow meter to photo-sensitive cell 112,212. This light beam is intermittently cut by turbine 110, 210 as it spins. The faster the flow rate through the flow meter, the faster the turbine spins and the faster the light beam is alternatively cut and restored. The output from the photo-sensitive cell thus oscillates at a frequency which is a function of the flow rate through the flow meter. Control unit 35 is adapted to determine the flow rates $V_c$ and $V_h$ from the signals output from photo-sensitive cells 112, 212 respectively. A more detailed understanding of flow meters of this type may be obtained by studying EP-A-0039244.

It will be appreciated that any known flow meter which provides a signal indicative of the flow through it may be incorporated into the present invention.

Control unit 35 thus is able to monitor the flow rates $V_c$ and $V_h$ and to control valves 13, 23 and is thus able to provide water at the required temperature and/or flow rate as described in relation to FIG. 2.

The system of FIG. 3 further comprises thermistors 15, 25 which provides signals to control unit 35 indicative of the cold and hot supply temperatures $T_c$, $T_h$ respectively. These may be used to provide further features but the main control sensing is still provided by the flow meters and the temperature sensors do not constitute an essential element of the invention.

As discussed above the basic equation for this system is equation (4):

$$T_o = \frac{V_c T_c + V_h T_h}{V_c + V_h}$$

In the system of FIG. 3 it is therefore possible for the absolute value of $T_o$ to be determined as all of $V_c$, $V_h$, $T_c$ and $T_h$ are known. It is therefore possible for the control unit 35 simply to have as inputs the required absolute value of $T_o$ and $V_o$ and for the valves to be set appropriately to achieve these values, without the need for the empirical setting of the output by the user. The measurement of $T_c$ and $T_h$ also makes it possible to maintain the output temperature even if the input temperatures vary slightly. Variations in the input temperature may be expected to be small and gradual and this means they can be ignored as in FIG. 2 without greatly affecting the accuracy of the system, but this also means that the input temperatures can be accurately monitored by thermistors in spite of their slow response time thus enabling even greater control accuracy and automation to be achieved.

The control panel 34 can take any suitable form and can provide for presetting the actual desired flow rate and temperature of the shower as mentioned above or can simply provide control switches so that the user can increase or decrease the flow and/or temperature of the output water from the shower head in an empirical manner as described in relation to FIG. 2. The microprocessor 33 is capable of storing preferred settings so that individuals can select their settings from the memory. This is particularly useful with pumped shower systems where the ability to select a remember flow as well as temperature is particularly important for children who are often frightened by the force of pumped hot and cold supplies.

For completeness, and by way of example, an operation of the shower unit of FIG. 3 will now be described. At the initial start up, both hot and cold valves 13 and 23 are opened to their maximum position. This is preferably found by monitoring the flow rate through each valve until a 90° movement of the respective stepper motor 14 or 24 produces no change in the flow meter output. Input temperatures $T_c$, $T_h$ are also monitored until a stable hot and cold supply level is found. The settings of the control valves are altered until the supply having the lower maximum flow rate has a flow rate of 70% of its maximum and the output temperature is equal to 40° C. This is the initialized temperature and flow rate. All alterations by the user are from this initial level. It is possible under this regime that the supply having the higher maximum flow rate, typically the cold water supply, is only being run at 40% of its full capacity, since the least pressurized line will determine the overall constraint. If a pump is subsequently installed in the domestic plumbing, no alteration to the shower system of this embodiment is necessary since this will be accommodated in the initializing routine. It would also be possible for instance to pump only the hot water supply if the cold water is mains fed.

Any supply alteration of flow rate and temperature is monitored and corrected by adjustment of one or both of the valves 13, 23. The first reaction of the system will be to open the valve for which the flow rate is reduced. Thus by initially running the lower pressure supply control valve at 70% of maximum any reduction in that supply can be compensated for by opening that valve further. If the required output temperature cannot be maintained by operating the valve then the overall output flow rate will be reduced. The priority of the system is to maintain temperature rather than overall flow rate. The microprocessor will also correct for variations in input temperature in the same way, however devices for monitoring temperature such as thermistors have a slow response as discussed above. Flow meters can respond to changes in flow instantaneously thus the system will appear to react to flow first and temperature last whereas both will in fact have equal importance.

The user can alter, via the control panel 34, both the flow rate and the temperature up and down.

Figure 4:
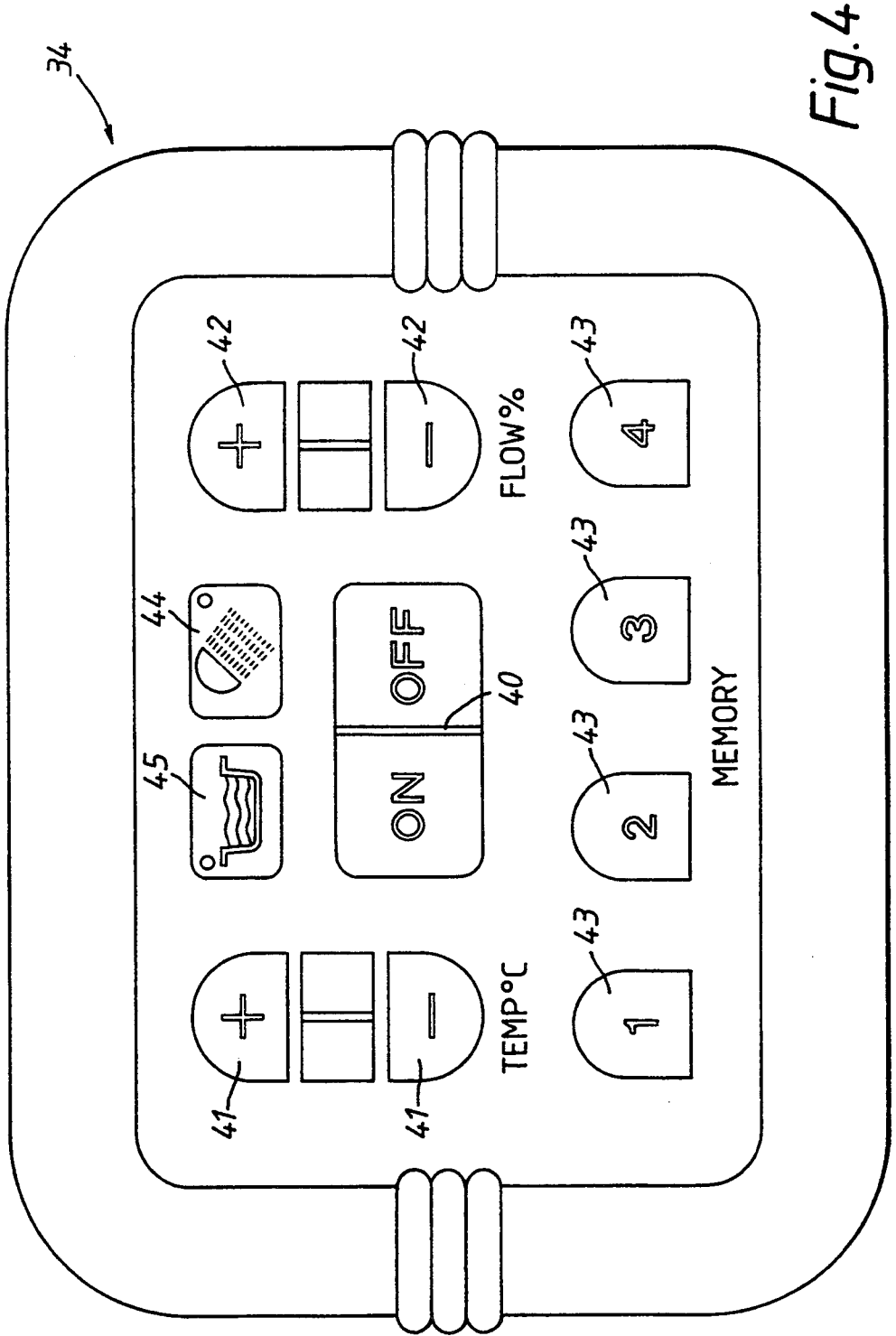
FIG. 4 illustrates a control panel suitable for use in conjunction with the invention.

A suitable control panel 34 for use with a system such as that shown in FIG. 3 is illustrated by way of example in FIG. 4. This comprises a control 40 for switching the system on or off, control 41 for adjusting the output temperature and control 42 for adjusting the output flow rate. When these controls are operated the control unit acts to control the output as described above.

The control panel illustrated in FIG. 4 may be used with a system which is able to memorize preferred settings. There are provided four memory controls 43 each of which may be used to store a particular output setting. This may be by way of storing appropriate values of R and $V_o$, or $V_c$ and Vh.

The above-described systems can be used for other arrangements in addition to the domestic shower description given above. For example, since the system is measuring both flow and temperature, the system could also dispense a pre-determined quantity of water in the form of public shower systems where the showers are only run for a short period. Further, rather than providing mixer water to a shower head, the water could be supplied to a bath filler tap enabling the user to simply set the temperature and bath volume level and then leave the apparatus to run the bath.

The control panel of FIG. 4 permits this by allowing a shower to be selected by control 44 and a bath by control 45.

I claim:

1. Apparatus for providing liquid at a defined temperature from a mixture of
    a first supply of liquid having a temperature higher than said defined temperature, and
    a second supply of said liquid having a temperature lower than said defined temperature, the apparatus comprising:
    flow rate sensing means located in at least one said supply for sensing the flow rate in said one of said first and second supplies;
    adjustment means arranged to control the flow rate in said one of said first and second supplies; and control means responsive to said flor rate sensing means to control said adjustment means whereby to adjust the flow rate and maintain the defined temperature of the mixed liquid.

2. Apparatus as claimed in claim 1 wherein said flow sensing means comprises a flow rate meter arranged to provide an electrical signal functionally related to the volume flow rate through said one supply, and said control means comprises an input arranged to receive said electrical signal.

3. Apparatus as defined in claim 1 wherein said adjustment means comprises a valve and a stepper motor, said stepper motor being arranged to receive control signals from said control means and to open and close said valve.

4. Apparatus as defined in claim 1 wherein said control means comprises a microprocessor.

5. Apparatus as defined in claim 1 arranged to provide water to a domestic shower.

6. Apparatus as defined in claim 2 wherein said adjustment means comprises a valve and a stepper motor, said stepper motor being arranged to receive control signals from said control means and to open and close said valve.

7. Apparatus arranged to provide liquid at a defined temperature comprising:
a first supply of said liquid having a temperature higher than said defined temperature,
a second supply of said liquid having a temperature longer than said defined temperature,
a mixing chamber having two inputs and an output, said two inputs being arranged to receive liquid from said two supplies respectively and said output being arranged to provide a mixture of the liquids from said two supplies,
first flow sensing means arranged to sense the flow rate in said first supply,
second flow sensing means arranged to sense the flow rate in said second supply,
first adjustable means arranged to control the flow rate in said first supply,
second adjustable means arranged to control the flow rate in said second supply, and
control means responsive to said first and second flow sensing means to control said first and second adjustable means whereby to maintain the temperature of the liquid at the output from said mixing chamber.

8. Apparatus as defined in claim 7 wherein said first and second flow sensing means each comprise a flow meter arranged to provide an electrical signal functionally related to the volume flow rate through the respective supply and said control means comprises inputs arranged to receive the electrical signals from said first and second sensing means.

9. Apparatus as defined in claim 8 wherein said flow meter comprises a turbine arranged to be rotated by flow through the meter and a light source and a photosensitive device arranged such that a light beam from said light source falls on said photosensitive device and is alternately interrupted and restored during rotation of said turbine.

10. Apparatus as defined in claim 7 wherein said first and second adjustable means each comprise a valve and a stepper motor, said stepper motor being arranged to receive control signals from said control means and to open and close said valve.

11. Apparatus as defined in claim 7 wherein said control means is further adapted to control said first and second adjustable means whereby to maintain the flow rate of the liquid at the output from said mixing chamber at a determined magnitude.

12. Apparatus as defined in claim 7 wherein said control means comprises a microprocessor.

13. Apparatus as defined in claim 7 further comprising first and second temperature sensing means arranged to detect the temperature of said first and second supplies respectively.

14. Apparatus as defined in claim 7 arranged to provide water to a domestic shower.

15. Apparatus for providing liquid at a defined temperature from a mixture of a first supply of liquid having a temperature higher than said defined temperature and a second supply of said liquid having a temperature lower than said defined temperature, the apparatus comprising:
flow rate sensing means located in at least one of said first and second supplies for sensing flowrate in said one of said first and second supplies and emitting an electrical signal indicative of said flowrate;
adjustment means in the form of a valve means and a stepper motor arranged to control the flowrate in said one of said first and second supplies;
control means responsive to said flowrate sensing means and connected to the stepper motor for controlling said adjustment valve means to adjust the flowrate and maintain said defined temperature of mixed liquid, the control means being in the form of an electronic data processing means having as an input the electrical output signal from the flowrate sensing means for computing the ratio of the flowrates in said first and second supplies; and
wherein there is not temperature sensor for sensing the mixed liquid temperature and hence the electronic data processing means has no input for a signal indicative of mixed liquid temperatures.

* * * * *